US009173010B2

(12) United States Patent
Sussman

(10) Patent No.: US 9,173,010 B2
(45) Date of Patent: *Oct. 27, 2015

(54) TELEVISION SYSTEM TO EXTRACT TELEVISION PRODUCT PLACEMENT ADVERTISEMENT DATA AND TO STORE DATA IN A REMOTE CONTROL DEVICE

(71) Applicant: Lester Sussman, Bethesda, MD (US)

(72) Inventor: Lester Sussman, Bethesda, MD (US)

(*) Notice: Subject to any disclaimer, the term of this patent is extended or adjusted under 35 U.S.C. 154(b) by 362 days.

This patent is subject to a terminal disclaimer.

(21) Appl. No.: 13/726,134

(22) Filed: Dec. 23, 2012

(65) Prior Publication Data

US 2014/0181862 A1 Jun. 26, 2014

Related U.S. Application Data

(63) Continuation-in-part of application No. 10/679,206, filed on Oct. 6, 2003, now Pat. No. 8,291,465.

(51) Int. Cl.
| H04N 7/08 | (2006.01) |
| H04N 5/44 | (2011.01) |
| H04N 7/18 | (2006.01) |
| H04N 21/81 | (2011.01) |
| H04N 21/41 | (2011.01) |
| H04N 21/478 | (2011.01) |
| H04N 21/488 | (2011.01) |
| G06Q 20/30 | (2012.01) |
| G06Q 30/02 | (2012.01) |

(52) U.S. Cl.
CPC ............ *H04N 21/812* (2013.01); *G06Q 20/30* (2013.01); *G06Q 30/0241* (2013.01); *H04N 21/4126* (2013.01); *H04N 21/47815* (2013.01); *H04N 21/4888* (2013.01)

(58) Field of Classification Search
CPC .......... G06Q 30/0241; H04N 21/4126; H04N 21/47815; H04N 21/4888; H04N 21/812
See application file for complete search history.

(56) References Cited

U.S. PATENT DOCUMENTS

| 4,614,971 | A  | * | 9/1986  | Maney et al. ................. 348/466 |
| 7,697,068 | B2 | * | 4/2010  | Aratani et al. ................ 348/553 |
| 2003/0028873 | A1 | * | 2/2003  | Lemmons ....................... 725/36 |
| 2005/0110909 | A1 | * | 5/2005  | Staunton et al. .............. 348/734 |
| 2008/0278634 | A1 | * | 11/2008 | Huang et al. .................. 348/734 |
| 2014/0300827 | A1 | * | 10/2014 | Gold-Gavriely et al. ..... 348/734 |

\* cited by examiner

*Primary Examiner* — Rong Le

(57) ABSTRACT

A television advertisement system whereby a viewer retrieves product placement contact information for a product, that has been promoted on the viewer's television by using a wireless remote control device. The invention provides the means for a viewer to easily obtain in-hand product contact and detailed information which can then be used at-will. Teletext data, which contains product information, is associated with a product's video signal and is automatically decoded and stored in the television's or TV set-top box's memory. The viewer retrieves on demand the product's teletext data stored in memory by using a remote control device. The product data is transferred to and stored in a remote control device's memory. The data is displayed on the remote's screen. The data stored in the remote control can be used to contact an advertiser for further information, or to purchase a product or service. This is achieved by wirelessly transferring pertinent contact information from the remote control to various communication devices, such as a computer, a telephone, a television set-top box, an electronic game console, etc.

20 Claims, 7 Drawing Sheets

TELEVISION SYSTEM TO EXTRACT TELEVISION PRODUCT PLACEMENT ADVERTISEMENT DATA AND TO STORE DATA IN A REMOTE CONTROL DEVICE

CROSS REFERENCE TO RELATED APPLICATIONS

This application is a continuation-in-part of U.S. patent application Ser. No. 10/679,206 filed on Oct. 3, 2003, which has issued as U.S. Pat. No. 8,291,465 on Oct. 16, 2012, to which priority is claimed, and which is fully incorporated herein by reference.

BACKGROUND OF THE INVENTION

1. Field of the Invention

The invention relates to a system for receiving television product placement advertisement associated teletext contact data and for a viewer to obtain on demand the teletext contact data in-hand using a television remote control device.

2. Description of Related Art

Currently product placement is the promotion of branded goods and services within the context of a television show or a movie (i.e. in a theater, or on a television set), rather than as an explicit advertisement. The brand names of product placement are visible to the viewer. Through product placement, advertisers hope that viewers will take note of the products used by the cast members, and thereby consider using the products themselves.

Whenever a product placement advertisement (ad) appears on a television (TV) and the viewer is interested in following up on the promoted product, today he must either remember the product, which generally displays no contact or detailed information, or scribble down the product name on a piece of paper. The problem then is to locate where the viewer can find the product of interest. In today's electronically networked world there are internet search engines, such as Google, Yahoo, etc., to help locate the products of interest. Even this electronic search-and-locate method is somewhat awkward, because a person is presented with many choices regarding the searched-and-found product and hence must further filter the presented search results for the precise information that the person is looking for.

The current invention uses a readily available feature of TV signals, namely teletext. Generally in the USA, teletext is not greatly used, as it is in Europe and other global regions. In the USA closed captioning (CC) is commonly available on most TV sets and all TV set-top boxes. Closed captioning is a specific use of teletext in the USA, i.e. as a government mandated aid to deaf TV viewers.

Product placement advertisement information, for example contact data, pricing, detailed descriptions, etc. are embedded by the current invention in a TV (or movie) signal, wherein the product placement advertisement appears as associated teletext data.

Rainsford teaches in U.S. Pat. No. 7,158,676 ('676) an interactive system that provides a video program with associated interactive content, which relates to the content of the displayed video program. The '676 patent does not teach retrieving and storing the interactive content in a television's remote control device, nor does it teach the use of teletext for embedding the interactive content of the video. The '676 patent teaches that a viewer interacts immediately with pertinent video content and its associated site on the internet.

Bates et al. teaches in U.S. Pat. No. 6,774,908 ('908) an interactive system that provides a video program with associated interactive content, which relates to the content of the displayed video program. The '908 patent teaches the programmatic locating of images in the stream of video frames, after initial image identification, and insertion of pertinent associated data. The '908 patent does not teach retrieving and storing the interactive content in a television's remote control device, nor does it teach the use of teletext for embedding the interactive content of the video. The '908 patent teaches that a viewer interacts immediately with pertinent video content and its associated site on the internet.

SUMMARY OF THE INVENTION

The current invention uses the terms "advertisement", "product placement" and "product placement advertisement" interchangeably, i.e. they are used synonymously.

The present invention's primary objective is a system and a method whereby a television (TV) viewer retrieves contact and/or more detailed information for a product placement advertisement that is, or has been promoted on the viewer's television by using a wireless device. The promotion of the product need not necessarily be visible to the viewer. For example, the advertisement cue could be audio, or it could be implied—for example a scenic frame could have a travel agent product placement advertisement associated with it.

One of the key premises to advertising is for the advertised product or service to be purchased. The invention provides the means for a viewer to easily obtain an advertisement's contact/detailed information in-hand, which can then be used at-will.

The present invention teaches the use of teletext data which is associated with a product's video/movie signal, which is automatically decoded and stored in the television's or TV set-top box's memory.

The viewer can retrieve on demand the product's associated teletext data stored in the television's or set-top box's memory by using a wireless remote control device. The advertisement data is transferred to and stored in the remote control's memory. The data is displayed on the remote's screen and/or the television's screen. No advertisement data is transmitted to the remote control device without the viewer's explicit interaction.

The viewer can retrieve, display, retain and delete any advertisement data stored in the remote control's memory, at any time, even if the TV is switched off. Furthermore, the viewer can retrieve, display, retain and delete any advertisement data stored in the TV's and/or TV set-top box's memory.

The data stored in the pertinent device's memory can be used to contact an advertiser for further information, or to purchase an advertised product or service. This is achieved by wirelessly transferring pertinent contact information from the pertinent device's memory to various communication devices, such as a computer, a telephone, a PDA, other electronic devices, etc. The contact information can also be used by simply displaying the data on a screen for the viewer to manually use.

DETAILED DESCRIPTION OF THE PREFERRED EMBODIMENT

Figure 1:
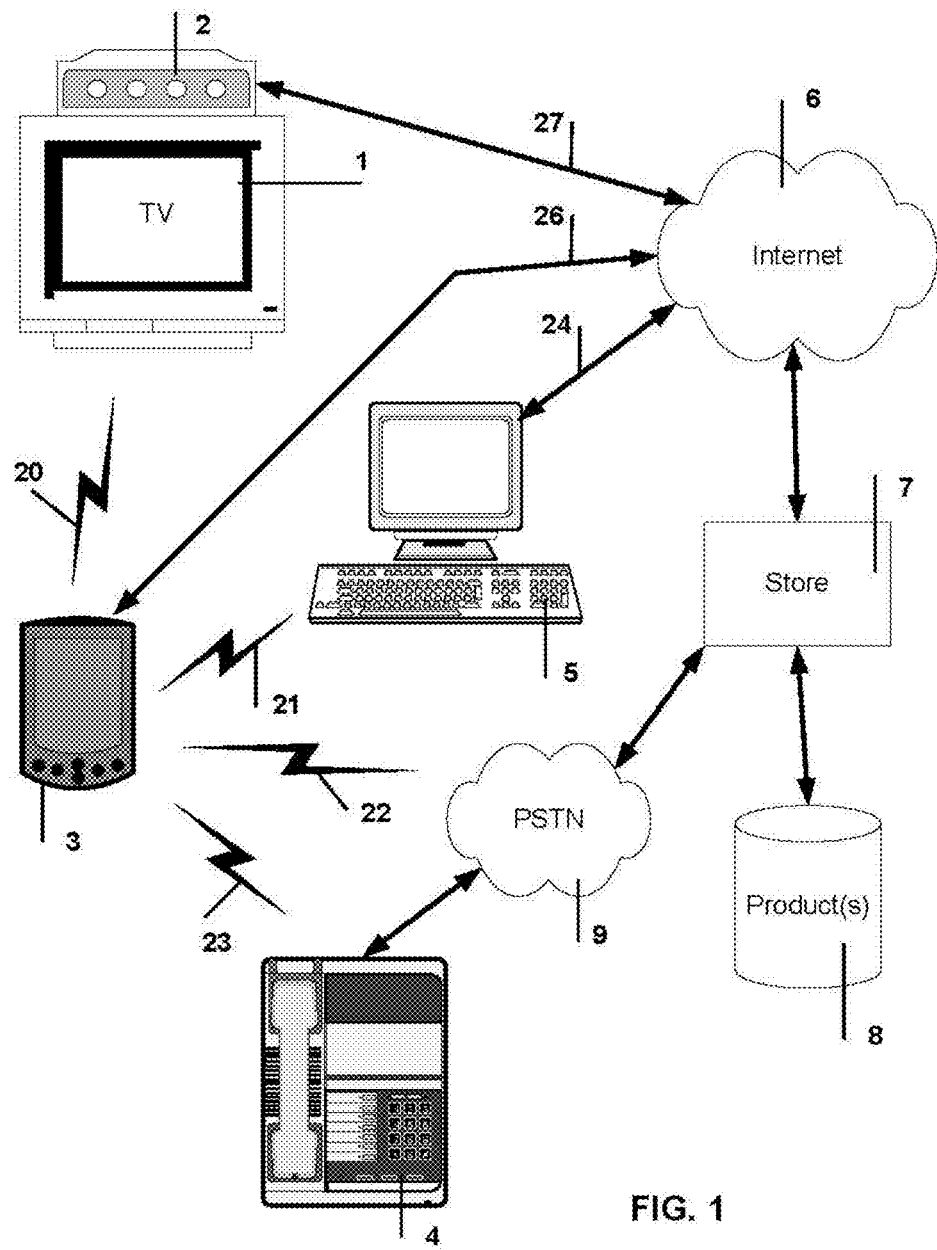
FIG. 1 is a block diagram of the various system components of the present invention.

The preferred embodiment's description is detailed in the following sections:
1. Overview of Product Placement Advertising
2. Overview of Teletext
3. Product Placement Advertisement Teletext Format
4. Viewer's Hardware Overview
   4.1) Set-top Box
   4.2) Remote Control Device
5. Creating Product Placement Advertisements
6. Receiving and Storing Product Placement Advertisements
7. Downloading a Product Placement Advertisement to a Remote Control Device
8. Contacting Advertisers Using a Remote Control Device We now consider each of these sections in further detail.

1. Overview of Product Placement Advertising

Product placement is the promotion of branded goods and services within the context of a television show or a movie (i.e. in a theater or on a television), rather than as an explicit advertisement. The brand names of product placement are generally visible to the viewer. Product placement is simply another form of advertising in TV shows and movies, but does not need a dedicated advertisement time slot. Through product placement advertisers hope that viewers will take note of the products used by the actors and actresses, and thereby consider using the products themselves. Unlike explicit advertising, product placements do not include any detailed information, for example the technical specifications of the BMW™ Z3 that James Bond is driving in the movie "GoldenEye", or where to find the Louboutin™ shoes that a show's actress is wearing, or a coupon for the range of makeup products that a show's star is using.

Today rating systems such as Nielsen™ measure the effectiveness of product placement advertising, i.e. the same system that is used to gauge today's television shows' audience viewership.

2. Overview of Teletext

The preferred embodiment of the invention uses a common feature of today's television systems, i.e. teletext. Teletext is a technology used to deliver data within an analog video signal by using the vertical blanking interval (VBI) between lines of active video. The VBI is a generally unused space located between the vertical synch pulse and the actual active video picture. Because of the limited number of available lines in the VBI, the actual amount of data that can be transmitted is limited to about 17.76 Kbits/sec multiplied by the number of transmitted lines.

Various teletext formats are available including the World System Teletext, (WST), the North American Broadcast Teletext Specification (NABTS) and others.

The teletext standards used by broadcasters all over the globe are defined in the International Telecommunication Union's ITU-R BT.653-2 document. The European teletext is defined as "teletext system B" for 625/50 Hz TV systems. NABTS teletext is defined as "teletext system C" for 525/60 Hz TV systems. WST for PAL is defined as "teletext system D" for 625/50 Hz TV systems and WST for NTSC is defined as "teletext system D" for 525/60 Hz TV systems.

Semiconductor manufacturers provide video encoders and decoders that encode and decode multiple teletext standards. For example, Intersil™'s HMP8117 decoder handles closed captioning, NABTS, WTS and BT.653 System B, C and D teletext. Cirrus Logic™'s encoders CS4954 and CS 4955 support closed captioning in NTSC and teletext for NTSC and PAL.

Most modern television sets have built-in teletext decoders. For example Sharp™ Corporation's 19R-M100 and Panasonic™'s CT-36SL13 TVs support closed captioning decoding and display. Hitachi™'s C50F550 TV system supports teletext decoding and display.

The insertion, i.e. encoding of teletext information into video signals is highly developed and is covered by many patents and available commercial products, e.g. MRG Systems™ DTP800 Digital Databridge and CT700 Teletext Scheduler and Optimum Technology™'s OPT-III Teletext Encoder.

Global TV broadcasting is graduating into the digital world, a technology without VBI. Analog teletext does not exist in digital television (DTV). Digital teletext is available with the evolution of DTV. The current standard for digital teletext is the Multimedia Hypermedia Experts Group open standard called MHEG-5, which is described in the International Organization for Standardization (ISO™) document ISO/IEC 13522-5. Another document specifies the method by which ITU-R System B Teletext (ITU-R Recommendation BT.653), also known as EBU Teletext, may be carried in DVB bitstreams.

The important thing to note is that the current invention does not exclude digital television (DTV) broadcasting, but uses analog television broadcasting in its preferred embodiment. To those knowledgeable in the art, it is obvious that teletext embedded in a digital video signal can be decoded at the viewer's end of the transmission. Many broadcasters, e.g. the BBC™ and BSkyB™, as well as USA broadcasters have implemented digital systems.

3. Product Placement Advertisement Teletext Format

In the invention's preferred embodiment, the teletext associated advertisement data stream consists of a number of paired data fields, i.e. an identifier tag field and an associated attribute field.

Each advertisement (the preferred embodiment considers an advertisement as a block of teletext data) is prefixed with a tag <AD> to distinguish it from other teletext information, such as classic closed captioning, or for example weather or flight information available in many European teletext systems. At the end of the advertisement teletext transmission block is a termination tag </D>. These two tags enable the microcontroller 32 to process more easily the advertisement teletext information.

The advertisement teletext block can be considered as a specialty page of teletext data, i.e. a sub-page, of teletext data embedded within a classic (as defined, for example in the ITU-R BT.653-2 document and its digital teletext equivalent) teletext page of data.

The format of the teletext advertisement block is as follows, and is transmitted left to right, top to bottom:

---

<AD> <FRM> frame-number <ID> ad-identifier-number <N> product name
<$> product cost <S> shipping cost <#> phone-number <W> web addr. <M>
mail addr. <P> payment </D>

---

Table 1 further describes the advertisement teletext transmission format. Note that the format of these tags can be other descriptors besides those used in the preferred embodiment of the invention. For example, the product's nametag could be {NAME}, or [PROD], etc. Furthermore the present invention does not exclude the use of other fields, for example expiration date/time for an advertisement offer (e.g. tag <E>), or email address (e.g. tag <@>), etc.

Not all advertisements have data for all of the fields. In this case, it can be handled in one of two ways:

(a) All of the fields are transmitted and where no data are available, the attribute field pair is blank. For example, say a product only has a name and a web address, and then the advertisement teletext transmission stream is as follows:
<AD><FR>100<ID>abc123<N>product name<$><S><#><W>web addr.<M><P></D>

(b) The second option is such that unused fields are not transmitted. For example, say a product only has a name and a web address, and then the advertisement teletext transmission is as follows:
<AD><FR>100<ID>abc123<N>product name<W>web addr.</D>

The preferred embodiment of the invention uses option (b), i.e. unused fields are not transmitted. This option saves on encoding the advertisement transmission block, decoding process resources, TVInfo Memory 35 usage, etc.

(4.1.4) TVInfo Memory 35 that stores simultaneously multiple, extracted product placement advertisement teletext data blocks.

(4.1.5) A microcontroller 32 (or microprocessor) that controls all processing circuits in the set-top box 2 and processes commands sent to it by the remote control device 3.

(4.1.6) A wireless transmitter Tx 34 circuit that transmits data to the remote control device 3. The preferred embodiment of the invention implements the wireless circuit as an infrared (IR) circuit. IR devices are commonly used in remote control devices, as well as other handheld devices, such as PDAs. Any other commercially available wireless transmitter technology could as easily be used in the invention, e.g. Bluetooth™, or Wi-Fi (e.g. the various 802.11 protocols), etc.

(4.1.7) A wireless Rx 35 circuit that receives data transmitted from the remote control device 3. The same wireless technology that applies to the Tx 34 circuit, applies to this circuit. The preferred embodiment of the invention implements IR technology, because of its ubiquity and relative ease for retrofitting the present invention into current art.

TABLE 1

| Field | Field Tag | Attribute of Field | Example |
|---|---|---|---|
| Advertisement Start | <AD> | Blank attribute field. | n/a |
| Frame Number | <FR> | Video Frame number | 100 |
| Id Number | <ID> | Unique product identifier | abc123 |
| Product Name | <N> | Name of the product. | Shoes by Gucci |
| Product Cost | <$> | Cost of product. | $740 |
| Shipping Cost | <S> | Cost to ship product. | $ 10.50 |
| Phone Number | <#> | Phone number to call. | 1.800.123-4567 |
| Web Address | <W> | Web site address where further product information is available. | Gucci.com/shoes/#abcde |
| Mail Address | <M> | Product distributor's mailing address. Can be used to mail a check, mail order, etc. for payment. | P.O. Box 123, New York, NY 10451 |
| Payment | <P> | Type of payment accepted, e.g. check, mail order, Visa ™, Mastercard ™, American Express ™, etc. | Check = 0<br>Visa = 1<br>Mastercard = 2<br>American Express = 3 |
| Advertisement End | </D> | Blank attribute field. | n/a |

4. Viewer's Hardware Overview

Referring to FIG. 1, the preferred embodiment consists of a television 1, a set-top box 2 and a remote control device 3. A video signal is received by the set-top box 2 with embedded teletext data that is associated with a product placement advertisement to be promoted, or is being promoted on the TV 1. The remote control device 3 has a display screen, data memory, control circuitry, transreceiver circuits and buttons to interact with the TV viewer.

4.1 Set-Top Box

Figure 2:
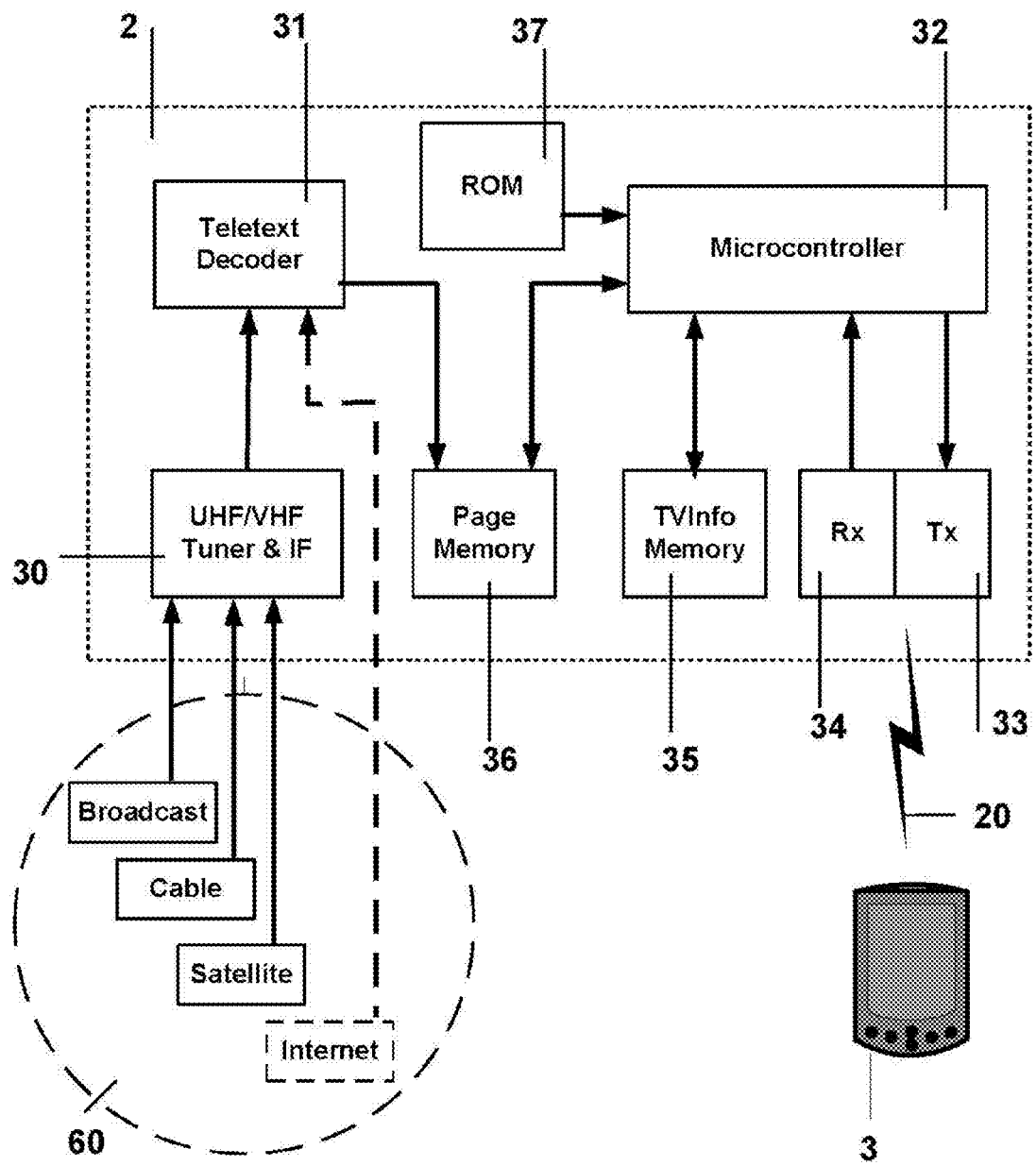
FIG. 2 is a block diagram of the key components of the invention's television set-top box.

The set-top box 2 comprises the following components as illustrated in FIG. 2:

(4.1.1) A UHF/VHF Tuner and IF 30 circuit that receives the transmitted video signal and converts it into a signal that the teletext decoder 31 can process.

(4.1.2) A teletext decoder 31 circuit that extracts the transmitted teletext data from the broadcast 60 video signal.

(4.1.3) Page memory 36 circuit in which non-advertisement teletext block(s) is (are) stored by the microcontroller 32.

(4.1.8) Read Only Memory, i.e. ROM 37 contains all programs and non-volatile data that the microcontroller 32 requires to control the functions on the set-top box 2.

Note that all of the functionality of the set-top box 2, as previously mentioned, could as easily be implemented directly in the TV 1. The preferred embodiment of the invention does not exclude this implementation in a TV 1.

4.2 Remote Control Device

Figure 3:
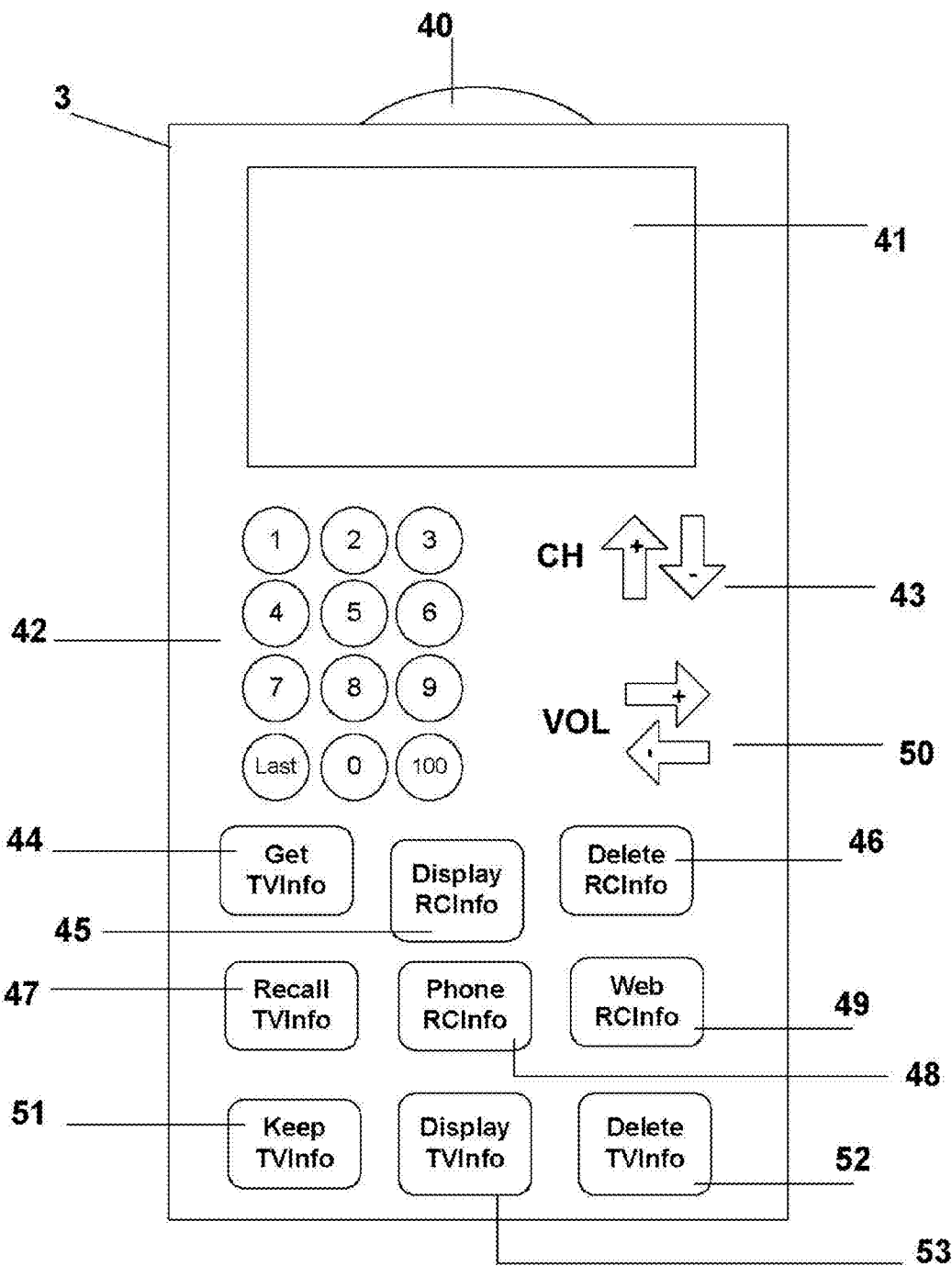
FIG. 3 is a plan view of the present invention's remote control device.

The remote control device 3 comprises the following components as illustrated in FIG. 3 (note that these features may also be implemented directly in a TV 1 and/or on a set-top box 2 as additionally available buttons or software menu options):

(4.2.1) A wireless transceiver 40 that communicates with the Tx 33 and Rx 34 transceiver circuits on the set-top box 2. Compatibly this is the same wireless technology used on the set-top box 2.

(4.2.2) A display screen 41 on which data text and other information is displayed. The preferred embodiment uses an LCD display, e.g. the Kyocera KHS038AA1AJ-L89 240×320 pixel display. The present invention does not exclude the use of any other available electronic screen technologies to implement the display screen 41.

(4.2.3) Standard channel input number buttons 42. These buttons could be used to retrieve directly various advertisements stored in the remote control device 3, which may have associated numbers to enable easier selection of a specific advertisement from a list of advertisements.

(4.2.4) Channel navigation buttons 43 that are used to browse TV channels as well as to browse (i.e. navigate) advertisement teletext data stored both in the remote control device 3 and in TVInfo Memory 35.

(4.2.5) Get-TVInfo 44 button to request transmission of the currently promoted TV advertisement(s) teletext data from the set-top box 2 to the remote control device 3. Note that the remote control 3 has non-volatile memory (NVRAM, not displayed) and related control circuitry to store the requested advertisement teletext data received from the set-top box 2.

(4.2.6) Display-RCInfo 45 button to request a display on the remote control device's screen 41 of advertisement teletext data currently stored in the remote control's memory. If more than one advertisement is stored in the remote control's memory, the viewer can use the channel navigation buttons 43, or the number buttons 42, to navigate through the previously stored advertisements.

(4.2.7) Delete-RCInfo 46 button deletes the currently displayed advertisement data on the remote control device's screen 41 from the remote control's NVRAM memory.

(4.2.8) Recall-TVInfo 47 button to request a display on the TV 1 screen of advertisement teletext data currently stored in the set-top box's TVInfo Memory 35. The viewer then uses the channel navigation 43 buttons, or the number buttons 42, to browse (i.e. navigate) the stored advertisement data, which is displayed on the TV 1 screen.

(4.2.9) Phone-RCInfo 48 button to dial the displayed advertisement data's phone number that is displayed on the remote control device's screen 41. For this button to work at least one of the following features must be available (referring to FIG. 1):

(a) The remote control device 3 is enabled to connect wirelessly 22 and directly to the Public Switched Telephone Network (PSTN 9), or to Voice over IP (VoIP, e.g. over the internet 6) network; or
 (b) To transmit wirelessly 23 to a telephone 4 a request to dial the displayed phone number, e.g. via DTMF signals or Voice over IP (VoIP), or via other technologies that are currently available; or
 (c) To transmit wirelessly 23 to a telephone 4 a text message request to send a Short Message Service (i.e. SMS, also known as Texting in the USA) to the displayed phone number via technologies that are currently available.

(4.2.10) Web-RCInfo 49 button to connect to the displayed advertisement's web address, i.e. which is displayed on the remote control's screen 41. The connection is (see FIG. 1):

(4.2.10.a) directly 26, or;
 (4.2.10.b) via the set-top box 27, or;
 (4.2.10.c) via a computer 24, or;
 (4.2.10.d) via a computer game console (e.g. Microsoft's Xbox, Nintendo's Wii, Sony's PlayStation, etc. [not displayed]).

(4.2.11) Keep-TVInfo 51 button marks for long term retention the displayed product placement advertisement's teletext data in TVInfo Memory 35. In other words, the advertisement's teletext data would not be erased from memory unless explicitly enacted via the Delete-TVInfo 52 button. A similar button Keep-RCInfo is also available (not shown), that marks for long term retention the displayed advertisement's teletext data in the remote control device 3 memory.

(4.2.12) Delete-TVInfo 52 delete's the TV screen's displayed product placement advertisement's teletext data from TVInfo Memory 35.

(4.2.13) Display-TVInfo 53 button requests a display on the TV 1 of product placement advertisement teletext data currently stored TVInfo Memory 35. If more than one advertisement is stored in the TVInfo Memory 35, the viewer can use the channel navigation buttons 43, and/or use of the numeric 42 buttons, to navigate through the previously stored advertisements' teletext data.

(4.2.14) Volume buttons 50 for the TV 1.

With reference to FIG. 1 through FIG. 3, a viewer uses a remote control device 3 to interact with a set-top box 2 in order to obtain the associated product placement advertisement information for later, or immediate use. The advertisement information is retrieved, stored in the remote control's NVRAM and displayed on the remote control's screen 41.

The viewer can review the product placement advertisement information that he has retrieved and stored on his remote control device 3. The viewer can then contact the product distributor and inquire further, or purchase the product or service. Purchasing can be made via:

a) a telephone 4; or
 b) a computer 5 connected to the internet 6; or
 c) directly from the remote control device 3, provided that the device can connect to the internet 6 or the PSTN 9; or
 d) via the set-top box 2.

Universal Electronics™ has software called Nevo™ that runs on personal digital assistants (PDAs) such as the HP™ iPAQ™ Pocket PC H3950 and H5400. Nevo software enables the PDA to be used as a remote control device 3. The Sony™ Clié™ PEG-NR70v PDA comes with software called Remote Commander™ that enables the PDA to be used as a remote control device 3. It is well known in the art that PDAs can be used to connect 22 to the PSTN 9 and to connect 26 to ane Internet 6 via a fax/modem card.

Note that the various remote control device 3 buttons could be implemented, with relative ease, as touch-screen options on the remote control device's screen 41. Various manufacturers of remote control devices have touch-screen circuitry. For example, the Philips™ TSU ProntoNEO™ Intelligent A/V remote control has a touch screen display. The preferred embodiment of the invention uses buttons as described above. It is also possible to implement the various remote control buttons directly in the TV 1 and/or in the set-top box 2.

5. Creating Product Placement Advertisements

Referring to FIG. 4 through FIG. 7, the initial stage in the current invention's process consists of creating a product placement advertisement with associated embedded teletext information. This stage includes using a video or a movie source 81, a product database 80 and a teletext multiplexer system 85. The fundamental objective of the invention is to associate information contained in the product database 80 with select images in frame(s) of the video or movie source 8.

Today's movies and television shows have a run-rate of about 30 frames a second. A single frame can be viewed as a single "still-photographed" image, i.e. a movie has a run-rate of 30 still-photographic images per second. Today television shows are generally 30 (thirty), 60 (sixty) and 90 (ninety) minutes in duration. This means that there are 54,000 (54 k), 108,000 (108 k) and 162,000 (162 k) frames per show which are available for product placement. Not all frames in a show may be used for product placement. For example, in broadcast television approximately 25% of a show is dedicated to explicit advertisements, i.e. dedicated advertisement time slots. Furthermore, a set of frames may simply not have any advertisement content.

Various techniques and commercial products (e.g. Click-Vision by Creative Frontier) are available which facilitate the association and insertion of interactive content (i.e. data) with a stream of video. U.S. Pat. No. 6,774,908 to Bates et. al. ('908) and U.S. Pat. No. 7,158,676 to Rainsford ('676) are examples of techniques which may be used to implement this process of the current invention. The '908 and '676 patents are hereby incorporated herein by reference.

Figure 5:
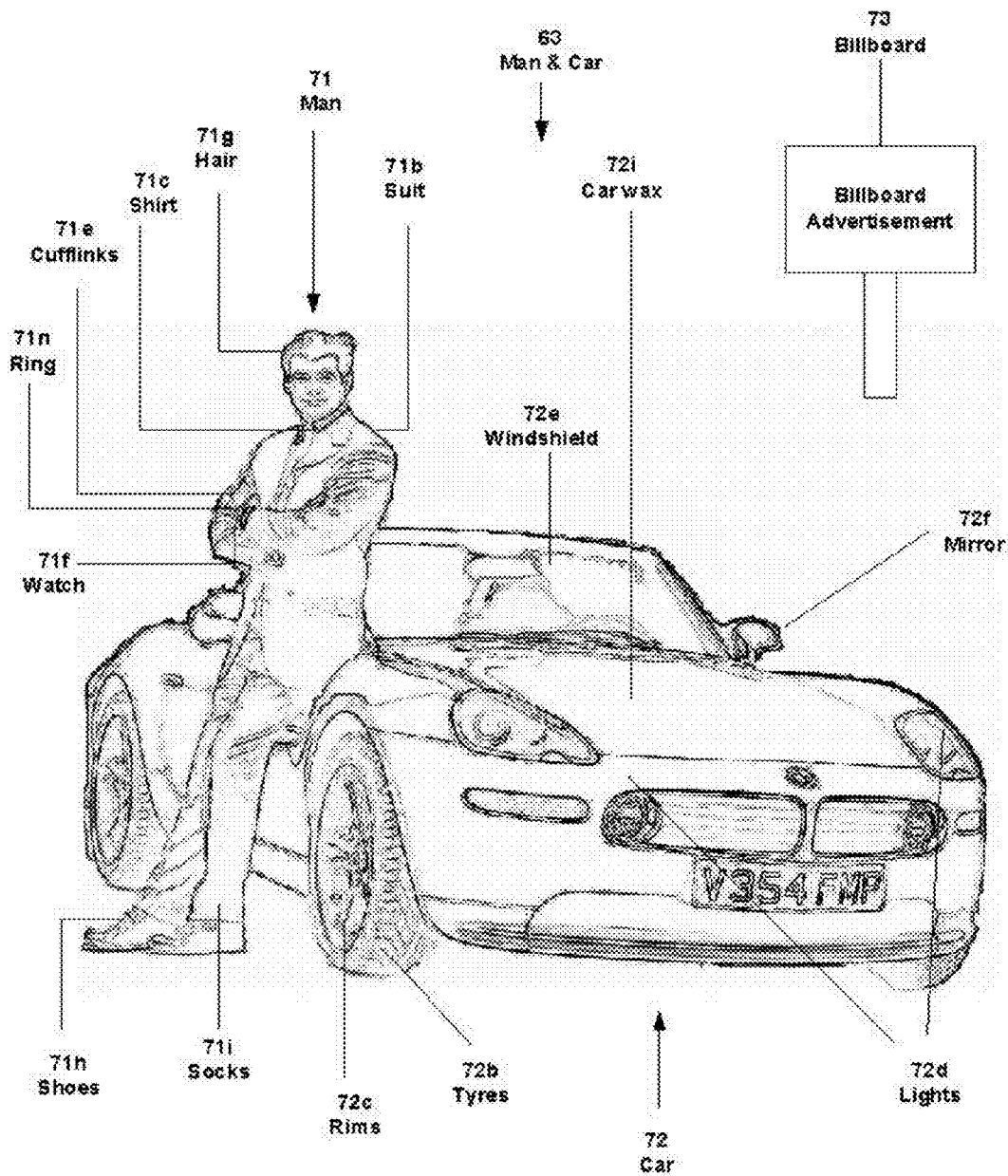
FIG. 5 is a diagram of a single video frame depicting a man and car with associated product placement advertisements.

FIG. 5 ("Man & Car") is now used to illustrate how product placement advertisement teletext data are inserted into a television show.

A computer workstation 82 is used to work with the various system components. These components are primarily the video/movie source 81 and the product database 80.

Figure 6:
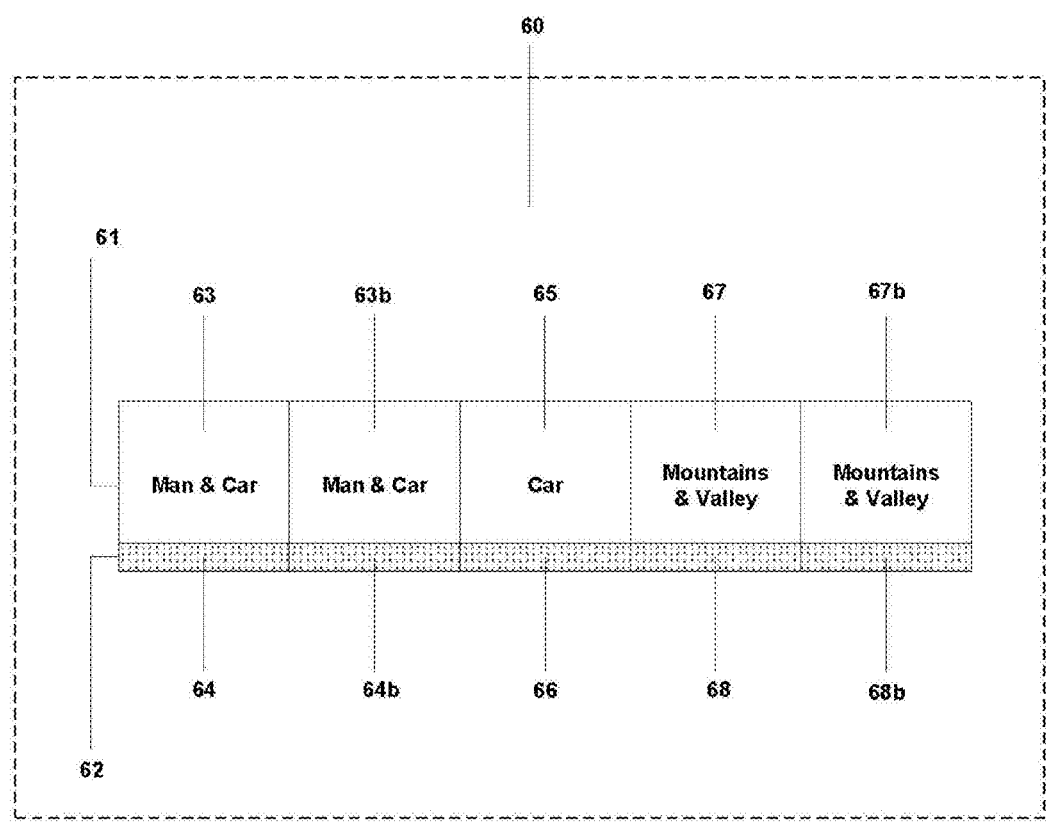
FIG. 6 is a block diagram of a sequence of video frames, each of which has embedded product placement advertising and associated teletext data.

FIG. 6 is a block diagram which illustrates a section of the video/movie source 81 that is used and streamed in the workstation video screen 83. There are three separate animation scenes (i.e. frames) illustrated in FIG. 6, i.e. "Man & Car" (labels 63 and 63b); "Car" (label 65) and "Mountains & Valley" (labels 67 and 67b). These scenes/frames appear in the workstation's video screen 83.

The product database 80 contains all of the data which are available to be associated with the various product placements. Some of this data needs to be "fresh", i.e. current and up to date. For example, if the advertiser is offering a product at a discounted rate for a given time period, then this limitation needs to be incorporated. One example of this offer could be a travel vacation package associated with the "Mountains & Valley" frames (labels 67 and 67b). The preferred embodiment of the invention implements this initial process in non-real-time to the broadcasting 87 of the video/movie source 81 to the viewer. Generally this step of the product placement process will be executed outside of the broadcasting studio/building by a party other than the broadcaster.

Real-time insertion of associated product placement data is defined as moments prior to the broadcasting 87 of the video/movie source 81 to the viewer. This option is not excluded from the invention, but it is not part of the preferred embodiment, because this stage of the invention generally requires more time than is available for real-time insertion. With greater workstation 82 computer processing power and more efficient software it is feasible to provide real-time insertion of associated product placement data in another embodiment of the invention. One example of this other embodiment is the real-time closed captioning of news broadcasts in the USA. In this other embodiment the product database 80 could be distributed and physically located outside of the broadcast studio, and would be securely interconnected via a network, for example the internet 6.

Figure 7:
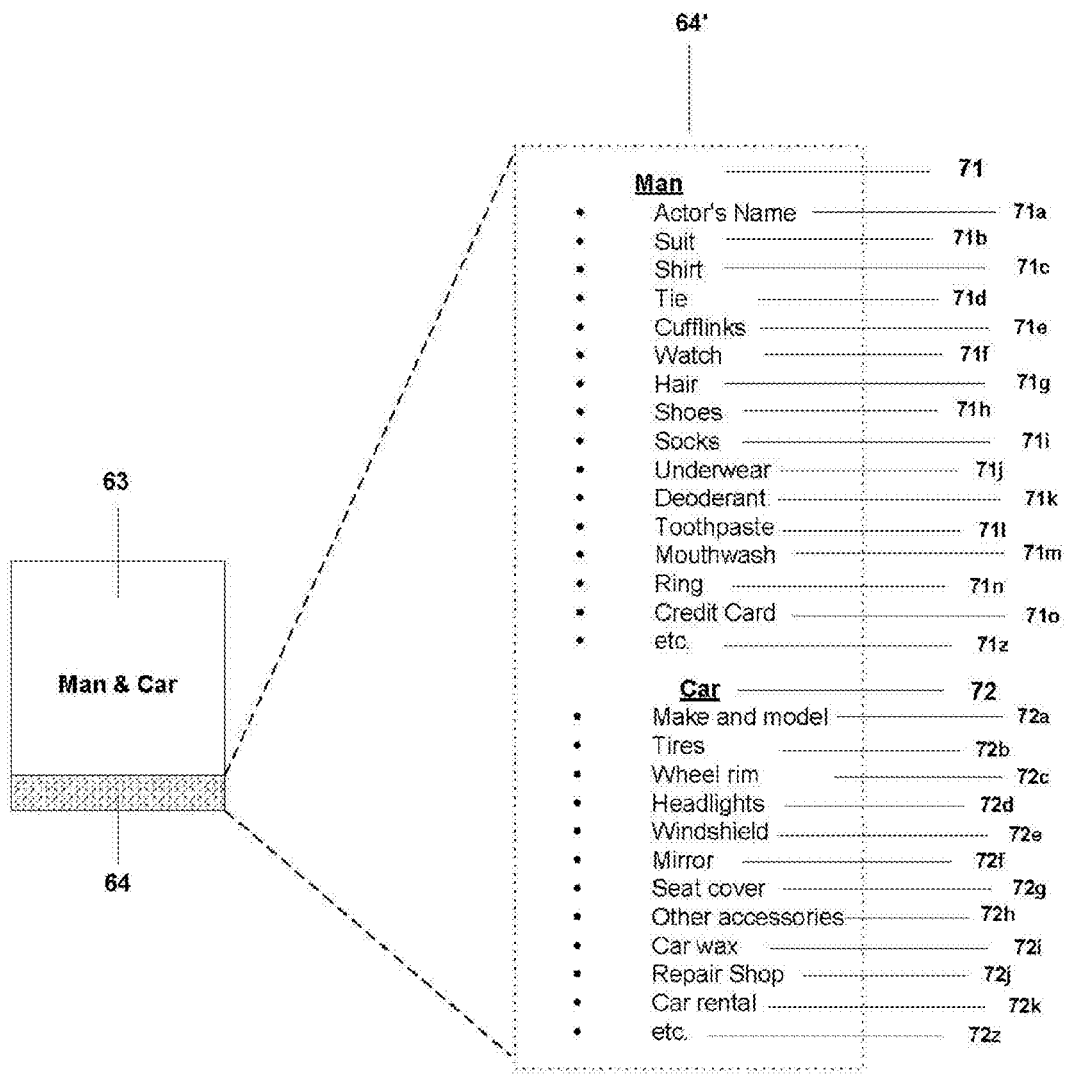
FIG. 7 is an expanded view of a single video frame's associated embedded teletext advertisement data.

As soon as the frame of "Man & Car" 63 appears on the video screen 83 the video/movie source 81 stream is paused by the operator. The product database 80 is searched via the product list screen 84 for the products which are of interest, i.e. as illustrated in FIG. 7, in Table 3 ("Man" product list) and Table 4 ("Car" product list). All of these products are inserted/associated (labels 64 and 64b in FIG. 6) with the video frames 63 and 63b in FIG. 6 by means of software on the workstation 82 and the teletext multiplexer 85 process in FIG. 4. This produces a video frame stream which has the pertinent product placement teletext data inserted, e.g. in FIG. 4 "Video/Movie+Teletext" 86. For a more detailed description of this process, refer to the section titled "Fixed Object Capture Application" in Bates '908 and the "Detailed Description" in Rainsford '676.

A note about the product's contact location data in the product database 80: this information could be a street address, a specific web site address (as illustrated in Table 3 and Table 4), or it could be a centralized web site address (not illustrated) which would redirect the interested viewer either to a location on the centralized web site or to a specific web site. For example the location information in Table 3 could be "centralWeb.com/ysl/suit" instead of the illustrated location "designapparel.com". The advantage to using a centralized web site location is that time sensitive information can more easily be updated. If a specific web site location was used rather than the centralized web location, then the complete product placement process would have to be repeated before the movie/video source 81 was re-published or re-broadcast at a later date or a different locale. The preferred embodiment of the invention includes the capability to use a centralized web site to re-direct a viewer to a location where up to date product information is available.

TABLE 3

"Man" Product List

| Product | Details | Price | Location |
| --- | --- | --- | --- |
| Actor's Name | Pierce Bronson, James Bond | — | piercebrosnan.com |
| Suit | Yves Saint Laurent | $1,995.00 | designapparel.com |
| Shirt | Burberry | $ 350.00 | burberry.com |
| Tie | John Varvatos | $ 85.00 | shop.nordstrom.com/tie/#101 |
| Cufflinks | Canali | $ 275.00 | shop.nordstrom.com/cuffs/canali/#99 |
| Watch | Rolex Submariner | $7,950.00 | rolex.com/submariner |
| Hair Products | Redken for Men | various | redken.com |
| Shoes | Gucci | $ 740.00 | gucci.com/shoes/getmesome |
| Socks | Bugatchi Uomo | $ 20.00 | shop.nordstrom.com/socks/bu#zz |
| Underwear | Jockey Elance | $ 20.00 | jockey.com |
| Deodorant | Speed Stick Power | $ 2.80 | drugstore.com |
| Toothpaste | Colgate | — | colgate.com |
| Mouthwash | Listerine Zero | $ 5.00 | drugstore.com |
| Ring | 2 CT. T.W. Diamond Fashion | $6,000.00 | zales.com |
| Credit card | American Express Platinum | — | americanexpress.com |

TABLE 4

"Car" Product List

| Product | Details | Price | Location |
|---|---|---|---|
| Make & Model | BMW Z3 | — | kbb.com/bmw/z3 |
| Tires | Goodyear Eagle GT | @$179.00 | goodyear.com |
| Wheel rim | BMW Rockville | — | bmwrockville.com.parts/rims |
| Headlights | Advance Auto Parts | — | advanceautoparts.com/hd/bmw#z3 |
| Windshield | Safelite AutoGlass | — | safelite.com |
| Mirror | Advance Auto Parts | — | advanceautoparts.com/bmw/z3 |
| Seat cover | Advance Auto Parts | — | advanceautoparts.com/seats/covrs |
| Car wax | Turtle Wax | $4.99 | turtlewax.com |
| Repair shop | BMW Rockville | — | bmwrockville.com/repairs |
| Car rental | Hertz | — | hertz.com/pd#9876AA |

Generally most product placement advertising is for products that are visible to the viewer in the video/movie source 81. The preferred embodiment of the invention provides a second product placement option. This option is for products that are not explicitly visible in the video/movie source 81. For example, in FIG. 7 the car rental 72k product placement is not visible, but an advertiser such as Hertz™ car rental could advertise their rates for renting the car 72, or any other vehicle. Another example of the second product placement option is the music that is heard during the display of the "Man & Car" 63 frames. A viewer could be interested in the details of the music that he hears (e.g. the name of the song, the name of the composer, etc.), and may be interested in knowing where to purchase the soundtrack. A product placement advertisement for audio products can also be inserted (not illustrated in FIG. 7) in the preferred embodiment of the invention. Another example for the use of product placements in the preferred embodiment of the invention are the use of static billboards (see label 73 in FIG. 5) and electronic advertising "walls" (not illustrated) which, for example surround the playing fields in sports such as football, tennis, golf, rugby, etc. Other examples for the use of product placements in the preferred embodiment of the invention include advertisements (not illustrated) on the clothing of sport players, advertisements painted on sport playing field turf, etc.

Figure 4:
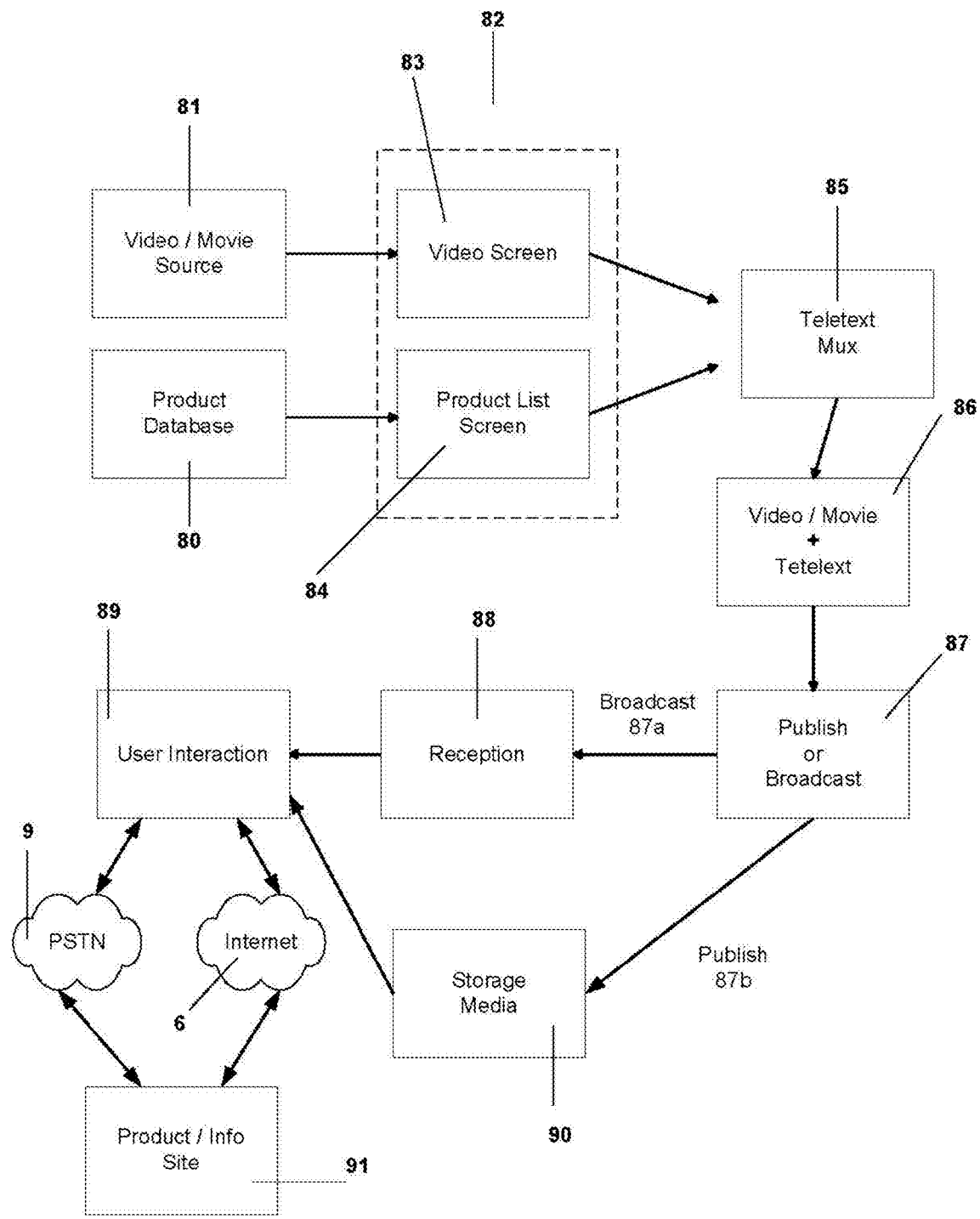
FIG. 4 is a block diagram of the processes for the present invention.

When all of the desired frames in the video/movie source 81 are associated with the pertinent products available in the product database 80, the resulting multiplexed video/movie 86 can then be published (e.g. to DVD, CD, Blue-Ray Disk, tape, etc.) or broadcast 60. This is illustrated in FIG. 4 by "Publish or Broadcast" 87.

The preferred embodiment of the invention does not include the capability for a viewer to select specific objects in a movie/video as taught by Bates '908 and Rainsford '676. For example, in Bates '908 "x and y" coordinates are tracked for each selectable object in a set of frames, which enables a viewer to select a specific object in a "Playback Mode of Operation". The preferred embodiment of the invention captures and allows the viewer to retrieve and interact with all (i.e. simultaneously) of the product placement data in any given frame of the movie/video 81 (see below section "6. Receiving and Storing Product Placement Advertisements"). Another embodiment of the invention could provide the capability of specific object selection as taught in Bates '908 and Rainsford '676.

6. Receiving and Storing Product Placement Advertisements

The invention's preferred embodiment provides for an easy, in-hand retrieval of advertisement information for product placements by a television viewer. With reference to FIG. 1 through FIG. 4, we now consider this aspect of the invention.

A television 1 is connected to a TV set-top box 2 and a remote control device 3 is used to control and interact with the TV's functionality.

Embedded in the invention's set-top box 2 are electronic circuits that extract teletext information that has been attached to (i.e. embedded in) the video signal. FIG. 2 depicts a preferred embodiment of the set-top box 2. The preferred embodiment of the invention has used a set-top box 2, but as mentioned previously these circuits can be embedded directly into a TV set 1. One of the reasons for using a set-top box 2 is because it is relatively easy to either add a new or upgraded set-top box 2, or replace a current set-top box 2 in order to use the current invention with old TV sets.

An originating broadcaster 60, via cable television, satellite television, broadcast television, or internet video streaming, transmits the video signal (or bit-stream as in the case of internet video streaming). The video signal (or bit-stream) has been embedded with product placement teletext at an originating point before being transmitted (see FIG. 4 and the above section "5 Creating Product Placement Advertisements").

When the receiver, i.e. the set-top box 2 or the TV 1 with embedded decoder circuits, receives a video signal via the UHF/VHF Tuner and IF circuit 30, the video signal is passed onto the teletext decoder 31. Note that in the case of an internet bit-stream being received, the viewer's receiver would have the pertinent electronic circuits (not illustrated) to process the video bit-stream. Examples of computer video cards include ADS Tech's Instant TV+FM PCI and Hauppauge's WinTV-PVR-150. The preferred embodiment does not discuss further this type of internet bit-stream reception, but the implementation is straight forward in the current state of the art.

In the preferred embodiment of the invention, the teletext decoder 31 and microcontroller 32 are generally part of the same commercially available integrated circuit. For example, Philips™ Semiconductors has an intelligent teletext decoder, the SAA5264 and the SAA5265 that incorporate Intel's™ 80C51 microcontroller. FIG. 2 has separated these two circuits for illustrative purposes, but the preferred embodiment does not exclude this type of separate circuit implementation.

The teletext decoder 31 extracts the product placement teletext data, and any other teletext data available, from the video signal and stores it in page memory 36. Whenever new product placement data is stored in page memory 36 the microcontroller 32 moves the data into separate memory, i.e. TVInfo Memory 35. The preferred embodiment of the invention does not exclude the scenario whereby the microcontroller 32 directly stores product placement teletext data directly into memory TVInfo Memory 35, once it has been decoded from the received television signal. As previously mentioned all product placement teletext data blocks are identified with a start and end tag. Commercially available teletext decoders generally have limited memory to store teletext in. For example, the SAA5264 can only store a single page of teletext and the SAA5265 can store ten pages of teletext. Using separate storage memory, i.e. TVInfo Memory 35, enables the invention to store more advertisements for later recall by the viewer (via the Recall-TVInfo 47 button.). TVInfo Memory 35 is implemented as Non-Volatile Random Access Memory (NVRAM) in order to retain advertisement data even if the set-top box 2 (or TV 1 depending on the implementation of the teletext decoder) has been powered down.

It is feasible to store the product placement data in page memory 36 rather than separate TVInfo Memory 35 and to identify it as such by using tags, or other methodologies. The preferred embodiment of the invention uses separate memory.

The preferred embodiment of the invention stores product placement data in the TVInfo Memory 35 as it is received in a First-In-First-Out (FIFO), i.e. as a stack data structure. When the memory 35 is full, the microcontroller 32 overwrites the first received and stored product placement data with the newly received data. This feature enables the viewer to browse (i.e. navigate) any product placements that have been received and previously stored in the TVInfo Memory 35. The invention does not preclude other data storage techniques such FILO, indexed, or a relational database, etc. from being used.

Once the associated product placement data is stored in the TVInfo Memory 35, it is available for the viewer to download into his remote control device 3.

The preferred embodiment of the invention automatically (i.e. without the viewer's explicit interaction) stores all of the frame's product placements' associated data together (i.e. as a group/glob) in memory 35. For example, in FIG. 7 all of the associated product placement data 64' (e.g. Table 3 and Table 4) are stored in memory 35 so that it is retrieved as a whole, i.e. simultaneously, upon a request by the viewer.

A note about the "Id Number" tag (see Table 1): This tag is used to associate a set of product placements as a group to be accessed by the viewer. For example, the suit 71*b* that the man 71 wears throughout the show generally varies. By tagging each suit that the man 71 wears in the movie with the same "Id Number" tag (e.g. 'allSuitsMan71') it is possible for a viewer to retrieve a list of all of the suits that the man 71 wears in all pertinent frames of the show. Similarly, if all of the cars that the man 71 drives in the show are tagged with the same "Id Number" tag (e.g. "#123abc"), the viewer can then retrieve a list of all of the cars that the man 71 drives in the show. This feature is part of a further embodiment of the invention and is not detailed in the preferred embodiment of the invention.

7. Downloading a Product Placement Advertisement to a Remote Control Device

With reference to FIG. 1 through FIG. 3, we now consider how the invention enables a viewer to retrieve various types of product placement data stored in TVInfo Memory 35. We now consider:

(7.a) a real-time displayed movie/video;
(7.b) a previously broadcast TV movie/video; and
(7.c) a published media movie/video, e.g. on a Digital Video Disk (DVD), tape, Compact Disc (CD), etc.

(7.a) In the first case, i.e. a real-time display, the movie/video being displayed on the TV 1 screen has associated product placement teletext data automatically stored in memory 35 on the set-top box 2. In this case, the viewer is watching the movie/video on a TV 1 and wishes to capture the associated product placement information for use. The preferred embodiment does not provide an indicator that product placement information is available for retrieval by the viewer. Another embodiment of the invention may include a visual indicator that product placement information is available for retrieval by the viewer. For example, a graphic icon or text is displayed appropriately in the movie/video on the TV 1 screen, for example in the top right corner of the screen (not shown). In the preferred embodiment of the invention, the viewer uses his remote control device 3 to send a request to the set-top box 2 via a wireless interface 40 on his remote control device 3. This is done by selecting the Get-TVInfo 44 button located on his remote control device 3. The set-top box 2 has a wireless receiver Rx 34 that captures the viewer's remote control device request and passes this request to the microcontroller 32 to process. The microcontroller 32 then retrieves the product placement data from memory 35 and transmits it to the viewer's remote control device 3 via the wireless transmitter Tx 33. If no product placement data are available the process returns a pertinent message (or an error code that is converted into a displayable message by the remote control device 3), e.g. "No Data". Once the remote control device 3 receives the advertisement data it displays the received data on the remote control's screen 41 and stores the data in the remote's memory. For example, if the "Man & Car" frame (see FIG. 6 and FIG. 7) is displayed on the TV 1 when the viewer selects the Get-TVInfo 44 button, all of the associated product placement data (see FIG. 7 and Tables 3 and 4) that has been stored in memory 35 by the microprocessor 32 is downloaded/transmitted to the viewer's remote control device 3.

(7.b) In the second case, i.e. the viewer is interested in a previously displayed/viewed frame's TV product placements; he selects the Recall-TVInfo 47 button on the remote control device 3. The remote control device 3 sends the recall request to the set-top box 2 via a wireless interface 40 on his remote control device 3. The set-top box 2 has a wireless receiver Rx 34 that captures the viewer's remote control request and passes this request to the microcontroller 32 to process. The microcontroller 32 then retrieves product placements' data, which it automatically stored in TVInfo Memory 35. This information is then displayed on the TV 1. The viewer browses the displayed advertisement list by using the channel buttons 43 (or if applicable the numeric keys 42) on his remote control device 3. If he locates product placement data that he wishes to retain on his remote control device 3, he selects the Get-TVInfo 44 button on the remote control device 3, and it is transmitted 20 via the Tx 33 circuit by the microcontroller 32 to the remote control 3. The remote control device 3 displays the information on its screen 41 and stores the advertisement data in its memory.

(7.c) The third case involves the movie/video being played back from published media, e.g. a DVD, rather than being broadcast to the viewer's TV 1. Once the source is introduced into the system 2, the teletext decoder 31 and microcontroller 32 process the viewer's request and the video stream as described above in section [7.a].

8. Contacting Advertisers Using a Remote Control Device

With reference to FIG. 1 through FIG. 3 and FIG. 7, we now consider how the present invention helps a TV viewer to contact advertisers about a product 8, or service.

Once the viewer has stored product placement data about a product 8 in his remote control device 3 (see above section "7. Downloading a Product Placement Advertisement to a Remote Control"), the viewer can then contact the advertiser.

As mentioned previously, the preferred embodiment of the invention groups and stores all of a frame's product placements together (see FIG. 7) in both the TV-Info Memory 35 and the remote control device's memory. The viewer can then browse (i.e. navigate) the list (i.e. the group) of product placements which may contain a pertinent product 8 that the viewer is interested in. The preferred embodiment of the invention displays the list/group of product placements in a hierarchical structure, but does not exclude other types of display structures from being used. So, for example, in FIG. 7 the viewer will initially see only two options on the remote control device's screen 41, i.e. "Man" 71 and "Car" 72, together with the actor's name 71*a* and the car's make and model 72*a*. The preferred embodiment of the invention does not exclude other data from being displayed at this point, but adheres to the rule of simplicity in its design and implementation. The viewer then optionally drills down (i.e. navigates) further by using the number keys 42 (various displayed options may be associated with numbers to facilitate easier navigation) and/or by using the arrow keys 43 on the remote control device 3 until the desired product is located, or not as in the case of no pertinent advertisement being available/promoted. For example, the viewer selects the "Car" 72 option and the product information as listed in Table 4 is displayed on the screen 41. The viewer can now contact the advertiser by:

(8.1) Displaying the advertisement information for the product 8 on the remote control device's screen 41 and jotting down the information on a piece of paper or on an electronic notepad device for later use. The displayed contact information may also be used to call immediately the advertiser (e.g. the store 7) using the telephone 4, or using a computer 5 to connect immediately to the displayed web site on the internet 6, for further processing. This option requires the viewer to re-enter manually the displayed contact information on the pertinent device that is to be used by the viewer. It is well known that manual data entry is prone to error, e.g. transposed numbers in a phone number, etc.

(8.2) Using the displayed information on the remote control device's screen 41 to connect indirectly 21 to a store 7 via a computer 5. This feature requires that the computer 5 has been enabled to receive wireless transmissions 21 from the remote control device 3, similar to how the TV 1 processes wireless commands sent to it from the remote control device 3. The wireless transmission 21 consists of a connect command, as well as the advertised web address, i.e. the "web addr." tag and attribute pair. A program resident on the computer 5 would then connect 24 via the internet 6 to the store 7 to inquire further on the advertised product(s) 8, or to enable the viewer to order the product(s) 8. Note that the computer's internet connection 24 is by any means that is available in the current art (wireline or wireless), e.g. dial-up analog access, cable broadband access, DSL broadband access, Wi-Fi hotspot access, etc.

(8.3) Using the displayed information on the remote control device's screen 41 to connect directly 22 to the store 7 via the PSTN 9. This feature of the remote control device 3 connecting directly to the store 7 was mentioned above in the section "3.2 Remote Control Device" and is achieved by using a fax/modem card, which is part of the remote control device 3.

(8.4) Using the displayed information on the remote control device's screen 41 to connect to the store 7 via the PSTN 9, or via VoIP on the internet 6, and a telephone 4. This feature would require a telephone 4 to be able to receive a wireless transmission 23 from the remote control device 3. This feature would require the telephone 4 to be able to process wireless commands, similar to how the TV 1 processes wireless command sent to it from the remote control device 3.

Note that many TV advertised products do not have a distributor or store 7 to contact, but are simply raising the awareness of the viewer to the products' availability. Examples for this type of advertising include cosmetic products, detergent products, motor vehicles, political campaigns, multi-national corporations, etc.

Another feature that is not displayed in FIG. 1 is that the remote control 3 could have a wireless interface to a printer. This feature would allow the viewer to obtain a hardcopy of the advertised product information that he stored in the remote control 3. Another feature not displayed in FIG. 1. is the capability of transmitting the displayed information from the remote control 3 to a PDA. Wireless communication between PDAs is common technology in the art.

What is claimed is:

1. An active television apparatus to extract on-demand television product placement advertisement contact information by a television viewer comprising:
    (a) a television receiver in said active television apparatus for receiving a television picture signal having a television product placement advertisement embedded therein, wherein said television product placement advertisement contact information embedded in a page of teletext data in said television picture signal,
        wherein said television picture signal displayed on said active television apparatus,
    (b) a data acquisition circuit for acquiring said page of teletext data in said television picture signal,
        wherein said page of teletext data in said television picture signal comprising a teletext product placement advertisement contact data block and other teletext data block, said teletext product placement advertisement contact data block comprising a plurality of data, said plurality of data including said television product placement advertisement contact information to contact by said television viewer a representative of said television product placement advertisement embedded in said television picture signal,
        wherein said teletext product placement advertisement contact data block embedded in said television picture signal occurring at a product placement advertisement teletext block insertion time, said product placement advertisement teletext block insertion time occurring in non real-time to said television picture signal transmission to said active television apparatus, wherein said teletext product placement advertisement contact data block available for acquisition by said data acquisition circuit during display of said television picture signal on said active television apparatus,
    (c) a first memory in said active television apparatus for storing simultaneously a plurality of said teletext product placement advertisement contact data block,
    (d) a second memory in said active television apparatus for storing simultaneously a plurality of said other teletext data block,
    (e) a first display in said active television apparatus for generating images representative of selected portions by said television viewer of said teletext product placement advertisement contact data block,
    (f) a first block selection for selecting by said television viewer said teletext product placement advertisement contact data block for display by said television viewer on said first display in said active television apparatus,
    (g) a first wireless transceiver circuit in said active television apparatus for (1) transmitting said teletext product placement advertisement contact data block to a remote control device upon receiving a request signal from said remote control device for said first block selection of said television product placement advertisement, and for (2) receiving a set of teletext product placement advertisement contact data block navigation instructions into said active television apparatus, said teletext product placement advertisement contact data block navigation instructions to navigate by said television viewer a plurality of said teletext product placement advertisement contact data block stored simultaneously in said first memory in said active television apparatus, (h) a second block selection for selecting by said television viewer said teletext product placement advertisement contact data block for display by said television viewer on a second display on said remote control device, (i) a third block selection for selecting by said television viewer said teletext product placement advertisement contact data block for transmission to said remote control device from said first memory, and (j) a microcontroller in said active television apparatus coupled to said first memory, said second memory, said first display, said first block selection, said second block selection, said third block selection, and said first wireless transmitter circuit, and wherein said microcontroller in said active television apparatus (1) cause delivery of a set of television control signals to said first wireless transmitter circuit upon receiving a set of signals from said remote control device via said first wireless transmitter circuit and (2) to select said teletext product placement advertisement contact data block, stored in said first memory in said active television apparatus, to be displayed by said television viewer on said first display in said active television apparatus in response to a request signal received from said remote control device.

2. The active television apparatus in claim 1, wherein said first block selection, said second block selection and said third block selection comprise a remote control device having a plurality of command keys.

3. The wireless transceiver circuit in claim 1 selected from the group consisting of an infrared circuit, a Bluetooth-enabled circuit and a WiFi-enabled circuit.

4. The television apparatus of claim 1 wherein said selected teletext product placement advertisement contact data block is transmitted and printed on a printing device by said television viewer.

5. The teletext in claim 1 is selected from the group comprising an analog teletext system and a digital teletext system.

6. The television apparatus in claim 1, wherein said teletext product placement advertisement contact data block comprises a first tag marking a start of said teletext product placement advertisement contact data block, and a second tag marking an end of said teletext product placement advertisement contact block, wherein said first tag and said second tag uniquely distinguishing said teletext product placement advertisement contact data block from said other teletext data block.

7. A remote control device to extract on-demand television product placement advertisement contact information embedded in a television picture signal displayed on an active television apparatus by a television viewer comprising:

(a) said television picture signal comprising a page of television teletext data embedded therein, wherein said page of television teletext data comprising a teletext product placement advertisement contact data block and other teletext data block, said teletext product placement advertisement contact data block comprising a plurality of data, said plurality of data including contact information to contact on-demand by said television viewer a representative of said television product placement advertisement contact, (b) a first memory in said active television apparatus for storing simultaneously a plurality of
said teletext product placement advertisement contact data block,
wherein said teletext product placement advertisement contact data block embedded in said television picture signal occurring at a product placement advertisement teletext block insertion time, said product placement advertisement teletext block insertion time occurring in non real-time to said television picture signal transmission to said active television apparatus, wherein said television picture signal received and displayed on said active television apparatus,
wherein said teletext product placement advertisement contact data block available for acquisition by a data acquisition circuit in said active television apparatus during display of said television picture signal on said active television apparatus, (c) a second memory in said active television apparatus for storing simultaneously said other teletext data block, (d) a third memory in said remote control device for storing simultaneously a plurality of said teletext product placement advertisement contact data block, each of said teletext product placement advertisement contact data block selected and stored on-demand by said television viewer in said third memory,
wherein said selected and stored teletext product placement advertisement contact data block associated with said product placement advertisement embedded in said television picture signal displayed on said active television apparatus,
wherein said active television apparatus is a first electronic device and wherein said remote control device is a second electronic device, (e) a display in said remote control device for generating images representative of selected portions by said television viewer of said television picture signal and said teletext product placement advertisement contact data block, (f) a user input device in said remote control device for enabling (1) input of television channel selection, (2) input of television volume control, (3) a set of television product placement advertisement teletext contact data block navigation instructions by said television viewer, including (4) a selection input by said television viewer of said television picture signal displayed on said active television apparatus, and (5) a set of communications instructions into said remote control device, (g) a wireless transceiver circuit in said remote control device for transmitting (1) a set of control signals and (2) a set of data signals to said active television apparatus and a third electronic device, and (3) for receiving an on-demand selection by said television viewer of said teletext product placement advertisement contact data block from said active television apparatus, and (h) a microprocessor in said remote control device coupled to said third memory, said display, said user input device and said wireless transmitter circuit in said remote control device,
wherein said microprocessor in said remote control device to cause delivery of (1) said set of control signals and (2) said set of data signals to said wireless transmitter circuit and (3) to select by said television viewer said teletext product placement advertisement contact data block to be displayed on said display in said remote control device in response to said set of communications instructions received from said user input device, and wherein said television product placement advertisement teletext data is selected from the group comprising an analog teletext system and a digital teletext system.

8. The remote control device of claim 7, wherein said set of communications instructions executed by said television viewer include:
 (i) retrieval by said television viewer and display on said display in said remote control device of said teletext product placement advertisement contact data block for a product placement advertisement embedded in said television signal displayed on said active television apparatus;
 (ii) retrieval by said television viewer and display on said display in said remote control device of said teletext product placement advertisement contact data block stored in said active television apparatus first memory of a product placement advertisement embedded in a television picture signal previously displayed on said active television apparatus;
 (iii) selection and deletion by said television viewer of said teletext product placement advertisement contact data block stored in said first memory in said active television apparatus; and
 (iv) retrieval by said television viewer of said teletext product placement advertisement contact data block stored in said active television apparatus first memory of a television picture signal currently displayed on said active television apparatus.

9. The remote control device of claim 7, wherein said set of communications instructions executed by said television viewer include:
 (i) retrieval by said television viewer and display on said display in said remote control device of said teletext product placement advertisement contact data block stored on-demand by said television viewer in said third memory in said remote control device;
 (ii) transmission of said retrieved teletext product placement advertisement contact data block on-demand by said television viewer to said third electronic device from said remote control device; and
 (iii) selection and deletion by said television viewer of said teletext product placement advertisement contact data block stored on-demand by said television viewer in said third memory in said remote control device.

10. The third electronic device in claim 9 selected from the group consisting of a telephone, a computer, a personal digital assistant device, an electronic game console and a television set-top box, and
 wherein said third electronic device comprising an electronic device other than said first electronic device and said second electronic device.

11. The wireless transceiver circuit in claim 7 selected from the group consisting of an infrared circuit, a Bluetooth-enabled circuit and a Wi-Fi-enabled circuit.

12. The remote control device in claim 7 wherein said selected teletext product placement advertisement contact data block is transmitted and printed on a printing device by said television viewer.

13. The remote control device of claim 7, wherein said teletext product placement advertisement contact data block comprises a first tag marking a start of said teletext product placement advertisement contact data block, and a second tag marking an end of said teletext product placement advertisement contact data block,
 wherein said first tag and said second tag uniquely distinguishing said teletext product placement advertisement contact data block from said other teletext data block.

14. A method to extract on-demand television product placement advertisement contact information by a television viewer comprising the steps:
 (a) embedding said television product placement advertisement contact information in a television picture signal;
  wherein said embedded television product placement advertisement contact information embedded in a page of teletext data,
  wherein said page of teletext data comprising a teletext product placement advertisement contact data block and other teletext data block, said teletext product placement advertisement contact data block comprising a plurality of data, said plurality of data including contact information to contact by said television viewer a representative of a television product placement advertisement embedded in said television picture signal;
 (b) receiving a multiplicity of said television product placement advertisement and said teletext product placement advertisement contact data block on an active television apparatus;
 (c) extracting a multiplicity of said teletext product placement advertisement contact data block embedded in said television picture signal, each of said teletext product placement advertisement contact data block associated with a television picture signal displayed on said active television apparatus, and storing simultaneously said teletext product placement advertisement contact data block in a first memory in said active television apparatus, wherein said teletext product placement advertisement contact data block available for acquisition by a data acquisition circuit in said active television apparatus during display of said television picture signal on said active television apparatus;
 (d) extracting a multiplicity of said other teletext data block on said active television apparatus, and storing simultaneously each of said other teletext data block in a second memory in said active television apparatus;
 (e) using a remote control device to transmit on-demand by said television viewer a multiplicity of said teletext product placement advertisement contact data block of said displayed television picture signal on said active television apparatus from said first memory in said active television apparatus to a third memory in said remote control device; and
  wherein said active television apparatus is a first electronic device and wherein said remote control device is a second electronic device; and
  wherein said teletext product placement advertisement contact data block embedded in said television picture signal occurring at a product placement advertisement teletext block insertion time, said product placement advertisement teletext block insertion time occurring in non real-time to said television picture signal transmission to said active television apparatus; and wherein said page of teletext data is selected from the group comprising an analog teletext system and a digital teletext system.

15. The method of claim 14 wherein said teletext product placement advertisement contact data block comprises a first tag marking a start of said teletext product placement advertisement contact data block, and a second tag marking an end of said teletext product placement advertisement contact data block, wherein said first tag and said second tag uniquely distinguishing said teletext product placement advertisement contact data block from said other teletext data block.

16. The television picture signal of claim 14 selected from the group consisting of a cable television signal, a satellite television signal, a broadcast television signal and an internet bit stream.

17. The method of claim 14 wherein said selected teletext product placement advertisement contact data block is transmitted and printed on a printing device by said television viewer.

18. The method of claim 14 comprising additional steps, executed by said television viewer, of:
(a) selecting by said television viewer a specific teletext product placement advertisement contact data block stored in said first memory in said active television apparatus and transmitting said teletext product placement advertisement contact data block to said remote control device;
(b) storing by said television viewer said transmitted teletext product placement advertisement contact data block in said third memory in said remote control device;
(c) navigating by said television viewer said first memory in said active television apparatus using an input on said remote control device; and
(d) displaying by said television viewer said teletext product placement advertisement contact data block, stored in said first memory in said active television apparatus, on said active television apparatus display using said remote control device.

19. The method of claim 18 comprising additional steps, executed by said television viewer, of:
(a) displaying by said television viewer said teletext product placement advertisement contact data block, stored on-demand by said television viewer in said third memory in said remote control device, on a second display on said remote control device;
(b) navigating by said television viewer said third memory in said remote control device using said input on said remote control device;
(c) using by said television viewer said teletext product placement advertisement contact data block stored on-demand by said television viewer in said third memory in said remote control device to contact a representative of said television product placement advertisement, using a third electronic device over a network.

20. The third electronic device in claim 19 selected from the group consisting of a telephone, a computer, a personal digital assistant device, a computer game console and a television set-top box; and wherein said third electronic device comprising an electronic device other than said first electronic device and said second electronic device; and wherein said network selected from the group consisting of an internet and a public telephone network.

\* \* \* \* \*